(12) United States Patent
Demuth et al.

(10) Patent No.: US 8,449,861 B2
(45) Date of Patent: May 28, 2013

(54) GENERATION OF HYDROGEN AND OXYGEN FROM WATER AND STORAGE THEREOF WITH SILICIDES

(75) Inventors: Martin Demuth, Mülheim an der Ruhr (DE); Peter Ritterskamp, Grefrath (DE)

(73) Assignee: H2 Solar GmbH, Lörrach (DE)

( * ) Notice: Subject to any disclaimer, the term of this patent is extended or adjusted under 35 U.S.C. 154(b) by 51 days.

(21) Appl. No.: 12/064,243

(22) PCT Filed: Aug. 24, 2006

(86) PCT No.: PCT/EP2006/008333
§ 371 (c)(1),
(2), (4) Date: Feb. 20, 2008

(87) PCT Pub. No.: WO2007/036274
PCT Pub. Date: Apr. 5, 2007

(65) Prior Publication Data
US 2008/0292536 A1    Nov. 27, 2008

(30) Foreign Application Priority Data
Aug. 24, 2005 (DE) .......................... 10 2005 040 255

(51) Int. Cl.
*C01B 3/06* (2006.01)
*C01B 13/02* (2006.01)

(52) U.S. Cl.
USPC ...................................... 423/579; 423/658.2

(58) Field of Classification Search
USPC ........... 423/579, 658.2, 157.5, 157.2, 157.52; 204/157.5, 157.2
See application file for complete search history.

(56) References Cited

U.S. PATENT DOCUMENTS

| | | | |
|---|---|---|---|
| 4,447,409 A * | 5/1984 | McGuiggan et al. | 423/416 |
| 5,262,023 A | 11/1993 | Sayama et al. | |
| 6,060,026 A | 5/2000 | Goldstein | |
| 6,592,723 B2 * | 7/2003 | Cha | 204/157.52 |
| 6,783,632 B2 * | 8/2004 | Cha | 204/157.52 |

FOREIGN PATENT DOCUMENTS

| | | | |
|---|---|---|---|
| KR | 2004021075 | * | 3/2004 |
| SU | 126872 | * | 3/1960 |
| WO | 2004/041715 | * | 5/2004 |

OTHER PUBLICATIONS

Maier, C.U. et al.: Hydrogen evolution on platinum-coated p-silicon photocathodes; Int. J. Hydrogen Energy, vol. 21, No. 10, 1996; pp. 859-864; XP002429607 (see international search report).
Vijh, A.K. et al.: Electrolysis of water on silicides of some transition metals in alkaline solutions; International Journal of Hydrogen Energy; col. 17 No. 7; pp. 479-483, XP002429608 (see international search report).
Takasugi, T.: Hydrogen-lattice defect interaction in embrittlement of L12 ordered intermetallics: a review; Intermetallics, vol. 4, 1996, pp. S181-S187; XP002429609 (see international search report).
Kumar, K.S. et al.: Low temperature embrittlement of Ni3(Si, Ti) alloys; Intermetallics; vol. 4, 1996, pp. 309-318; XP002429610 (see international search report).
Takasugi, T. et al.: Environmental embrittlement and grain boundary segregation of boron and carbon in Ni3(Si, Ti) alloys; Materials Science and Engineering A, vol. 192/193; pp. 407-412; 1995; XP002429611 (see international search report).

* cited by examiner

*Primary Examiner* — Wayne Langel
(74) *Attorney, Agent, or Firm* — Gudrun E. Huckett

(57) ABSTRACT

In a process for photochemical and thermochemical generation of hydrogen and/or oxygen, water is contacted with at least one Si-containing compound selected from silicides, silicide-like compositions, and oxides of the silicides and silicide-like compositions. The Si-containing compound is selected from metallosilicides and non-metallic silicides of the formula $RSi_xO_y$, wherein R represents an organic, metallic, organometallic, biochemically derived and/or inorganic residue, wherein Si is silicon. The compound is preferably a silicide moiety with X>zero.

27 Claims, No Drawings

GENERATION OF HYDROGEN AND OXYGEN FROM WATER AND STORAGE THEREOF WITH SILICIDES

The present invention relates to a process for the photo- and thermochemical production/generation of hydrogen and/or oxygen wherein water is brought into contact with suicides and silicide-like compositions and/or oxides thereof.

BACKGROUND

Several procedures for the oxidation and/or reduction of water to yield hydrogen and oxygen by the aid of metallic catalysts have been disclosed. The catalysts employed so far for this latter purpose are lanthanide-type photocatalysts, such as $NaTaO_3$:La, catalysts based on rare earth metals, such as $R_2Ti_2O_7$ (R=Y, rare earth), or $TiO_2$-derived semiconductor materials arranged in a so-called tandem cell. Notably, in these procedures no mention of the use of silicides and silicide-like compositions and/or oxides thereof has been made for the title applications.

The processes for the generation of hydrogen and oxygen from water comprise reduction and/or oxidation processes using semiconductors and light. These processes are also called in summa water splitting processes. The hitherto disclosed procedures employ UV light. Although in some cases remarkable amounts of hydrogen and oxygen evolution is observed, the irradiation conditions are not suitable for solar applications. Further, the preparations of the catalysts are laborious and require uneconomically high temperatures, starting from expensive materials of very high purity. Furthermore, these processes require water of very high purity, i.e. tri-distilled water. Of the cases no indication concerning longer time applications including the consequences for the stability of the catalysts is made.

Therefore subject matter of present invention is a process for the photo- and thermochemical production/generation of hydrogen and/or oxygen wherein water is brought into contact with suicides and silicide-like compositions and/or oxides thereof., i.e. compositions all containing silicon and oxides thereof and being of the molecular formula $RSi_xO_y$, wherein R represents pure or mixed organic, metallic, organometallic and/or biochemically derived residues and/or inorganic residues, and Si being silicon and specifically a silicide moiety with X>0 and O is oxygen with Y 0. The silicide moieties in these compositions exhibit characteristically a high electron density at silicon. The silicides and silicide-like compositions and/or oxides thereof can react catalytically in these aforementioned processes proceeding with or without light. However, upon irradiation of the reactions an increase of gas evolution is observed, this notably applying to artificial light as well as sunlight. Higher reaction temperatures are often favourable for these processes. Suicides and silicide-like compositions and/or oxides thereof are mostly semiconductor-type materials. Furthermore, these compositions are able to store/release and/or absorb/desorb hydrogen and oxygen reversibly wherein oxygen storage/release and/or absorption/desorption is favourable but can occur simultaneously with hydrogen storage/absorption and desorption/release. The release/desorption of hydrogen and oxygen can occur at ambient or higher temperatures, especially the processes concerning hydrogen, depending on the nature of the suicides and silicide-like compositions and/or oxides thereof employed.

Furthermore, it was found that coupling/complexing/attaching/binding of a dye such as perylenes, perylene dyes and perylene congeneers/analogs to silicides and silicide-like compositions and/or oxides thereof is favourable for the light absorption and hence reactivity of the silicides and silicide-like compositions and/or oxides thereof.

Further, it was found that the reactions using suicides and silicide-like compositions and/or oxides thereof for the purpose of water reduction and/or oxidation to yield hydrogen and/or oxygen, respectively, can be carried out by employing the silicides and silicide-like compositions and/or oxides thereof in immobilized form, i.e. when these compositions are attached/fixed onto or in a polymeric surface or material, as well as onto or in a glass or glass-like material, especially when the polymeric and/or glass-type material is electrically conducting.

Further, it was found that the storage/release and/or absorption/desorption of hydrogen and/or oxygen using silicides and silicide-like compositions and/or oxides thereof when these compositions are immobilized, i.e. when these materials are attached/fixed onto or in a polymeric surface and/or glass and/or glass-like material, this in processes carried out with or without light.

Furthermore, processes wherein oxygen is transformed to polyoxygen of the formula $O_n$ (n>3) and/or hydogenpolyperoxides of the formula $H_2O_n$ (n>2) including the back reactions to form oxygen again have not been described in literature so far, but have been found experimentally here; theoretical studies based on calculation predicting a shallow energy minimum and hence low to questionable stability for polyoxygen and hydrogenpolyperoxides in the gas phase. However, the experienced stability of polyoxygen and hydrogenpolyperoxides is seemingly due to stabilization in solution and/or by a metal.

DESCRIPTION OF THE INVENTION

Surprisingly, it has now been found that these disadvantages can be avoided by employing suicides, silicide-like compositions, metallosilicides and non-metallic suicides such as borosilicides, carbosilicides and nitrosilicides, i.e. compositions all containing silicon and being of the molecular formula $RSi_xO_y$ wherein R represents an organic, metallic, organometallic or inorganic residue, and Si being silicon and specifically a silicide moiety with X>zero and O is oxygen with Y zero (this ensemble of silicide-type compositions is in the following text named silicides and silicide-like compositions and/or oxides thereof). The silicide moieties in these compositions exhibit characteristically a high electron density at silicon, i.e. higher than in the parent silicon atom.

The non-metallic silicides such as borosilicides, carbosilicides and nitrosilicides are also called silicon borides, carbides and nitrides, respectively.

Examples of silicides, silicide-like compositions, metallosilicides and non-metallic suicides are silicides of the formula $RSi_xO_y$ wherein R represents an organic, metallic, organometallic, biochemically derived and/or inorganic residue, and Si being silicon and specifically a silicide moiety with X>zero and O is oxygen with Y zero wherein a choice of R can be lithium, beryllium, sodium, potassium, calcium, copper, zinc, rhodium, scandium, rubidium, gallium, selenium, rhodium, palladium, cadmium, lead, osmium, antimon, iridium, tungsten, tin, strontium, barium, titanium, nickel, iron, thallium, boron, cobalt, platinum, manganese, titanium, silicon, carbon, carbon in form of nanotubes, iridium, molybdenum, nitrogen, zirconium, tantalum, vanadium, chromium, silver, gold, lanthanides, actinides, organic residues such as dyes, i.e. perylenes, alkoxy residues and/or oxides of these residues R as well as mixtures of these residues R. Selected examples are titanium silicides ($TiSi_2$, $Ti_5Si_3$), nickel silicide ($Ni_2Si$), iron silicides ($FeSi_2$, $FeSi$), thallium silicide ($ThSi_2$), borosilicide or also silicon tetraboride named ($B_4Si$), cobalt silicide ($CoSi_2$), platinum silicide ($PtSi$, $Pt_2Si$), manganese silicide ($MnSi_2$), titanium carbosilicide ($Ti_3C_2Si$), carbosilicide/poly-carbosilicide or also silicon carbidelpoly-silicon carbide named (CSi/poly-CSi or SiC/poly-SiC), iridium silicide ($IrSi_2$), nitrosilicide or also named silicon nitride ($N_4Si_3$), zirconium silicide ($ZrSi_2$), tantalum silicide ($TaSi_2$), vanadium silicide ($V_2Si$) or chromium silicide ($CrSi_2$) and/or oxides thereof, perylene titanium or vanadium silicides, methoxy or ethoxy titanium or vanadium or iron silicides and oxides thereof.

The suicides and silicide-like compositions and/or oxides thereof are cheap, abundant and have so far not been claimed for the use with respect to the title applications. They have been used for transistor technique and photovoltaic devices and applications thereof.

The silicides and silicide-like compositions and/or oxides thereof can be used for the generation of hydrogen and/or oxygen from water by conducting the reactions with or without light, i.e. photonic and/or thermal processes, respectively.

The suicides and silicide-like compositions and/or oxides thereof are materials containing also silicon atoms with enhanced electron densities as compared to elemental silicon. Such effect happens when silicon is brought into contact with other elements and/or oxides thereof which can be of metallic and/or non-metallic nature.

It is also important to note that silicides and silicide-like compositions oxidize upon contact with water, oxygen and other oxidizing media to various degree, i.e. 0-100% dependent on the reaction conditions.

Silicides and silicide-like compositions and/or oxides thereof can be prepared by bringing into contact the individual elements and/or the oxides thereof in various ratios in solution/suspension as well as in solid and/or melted and/or gaseous form.

The suicides and silicide-like compositions and/or oxides thereof are mainly semiconductor-type materials with high electrondensities at silicon, carbon, nitrogen and boron, respectively. The claimed processes for the generation of hydrogen and/or oxygen using suicides and silicide-like compositions and/or oxides thereof can be achieved with or without light, but are significantly more efficient when running under irradiation. The light and thermal energy can be artificial or of solar origin (200-15000 nm emission of the light and thermal source) and can be diffuse or concentrated. The thermal energy being produced by the light source, besides the photonic energy and heat in general, can accelerate the gas evolution processes. In general, higher reaction temperatures are usually promoting the processes rather favourably.

The silicides and silicide-like compositions and/or oxides thereof are mostly absorbing sufficient solar or artificial radiation by themselves without the need for major surface engineering to effect reduction and/or oxidation of water to generate hydrogen and/or oxygen, respectively.

Furthermore, the herein claimed title processes are occurring concomitantly, but can be steered by temperature and the nature of silicides and silicide-like compositions and/or oxides thereof.

Surprisingly it was also found that the water quality and purity is of minor importance or even negligible for carrying out the title processes, i.e. oxidation and/or reduction of water as well as storing/abrorbing and releasing/desorbing hydrogen and oxygen, respectively, using suicides and silicide-like compositions and/or oxides thereof.

It has also to be noted that the herein claimed activity of the suicides and silicide-like compositions and/or oxides thereof for the purpose of water reduction and/or oxidation to yield hydrogen and/or oxygen, respectively, is predominantly of catalytic nature, this refers to dark reactions as well as to reactions using light (artificial and/or solar light).

Further, it was found that the reactions using silicides and silicide-like compositions and/or oxides thereof for the purpose of water reduction and/or oxidation to yield hydrogen and/or oxygen, respectively, can be carried out by employing the silicides and silicide-like compositions in immobilized form, i.e. when these materials are inbedded in, attached/fixed onto a polymeric material (such as polyamid, macrolon or plexiglass) or surface or glass or glass-like material, especially when the polymeric and/or glass-type material is electrically conducting.

The reactions such as described above can also be conducted at elevated temperatures.

The formation of the oxides of the silicides and silicide-like compositions can be carried out in water and/or oxygen containing atmosphere or in presence of other oxidants wherein the speed of oxide formation depends on the reaction conditions, such as temperature, presence of inert gas, pH of the reaction media and other physical conditions such as stirring, shaking or not moving the reaction media at all. The growth of the oxide layers (0-100%) can conveniently be followed and analyzed by XPS and XRD spectroscopy. The same types of analyses are applied when bringing into contact already oxidized elements and components prior to reaction and employing these silicides and silicide-like oxides and/or partially oxidized compositions for the above described purposes.

Furthermore, it was found that coupling/complexing/attaching/binding of a dye or an agglomeration of dyes to silicides and silicide-like compositions and/or oxides thereof is favorable for the light absorption and hence reactivity of these compositions (so-called dye-sensitized semiconductor reactions). Most favorably dyes such as perylenes and analogs thereof are employed. These dye-complexed silicides and silicide-like compositions and/or oxides thereof can also be applied when running thermal reactions, this even at elevated temperatures, since the perylene dyes are thermally stable.

Additionally, it was found that the silicides and silicide-like compositions and/or oxides thereof can store/release and/or absorb/desorb hydrogen and/or oxygen reversibly. The storage/release and/or absorption/desorption of oxygen is therein most favourable but can occur together with the storage/release of hydrogen. The release/desorption of hydrogen and oxygen can occur at ambient temperatures, especially the release/desorption of hydrogen, but these processes are more favourable at higher temperatures. The rates of these processes depend on the reaction temperature and the nature of the semiconductor-type material employed, i.e. of the silicides and silicide-like compositions and/or oxides thereof.

The higher temperatures stated above can be created electrically, by earthern temperature, solar energy, furnaces, microwave discharge or any other source of thermal energy.

Further, it was found that the reactions using silicides and silicide-like compositions and/or oxides thereof for the purpose of water reduction and/or oxidation to yield hydrogen and/or oxygen, respectively, can be carried out by employing the silicides and silicide-like compositions and/or oxides thereof in immobilized form, i.e. when these compositions are attached/fixed onto or in a polymeric surface or material, as well as onto or in a glass or glass-like material, especially when the polymeric and/or glass-type material is electrically conducting.

It was also found that the storage/release and/or absorption/desorption of hydrogen and/or oxygen using silicides and silicide-like compositions and/or oxides thereof when these compositions are immobilized, i.e. when these materials are attached/fixed onto or in a polymeric surface or glass or glass-like material, this in processes carried out with or without light.

The photochemical and thermal processes stated above can be conducted with silicides and silicide-like compositions and/or oxides thereof in catalytic amounts.

Both, the photochemical and thermochemical processes stated above can be conducted at elevated temperatures which is even beneficial for the course of the processes.

The processes stated above leading to storage/absorption of oxygen are concomitant with the storage/absorption of hydrogen but it is found that the selectivity and the speed of such processes are dependent on the reaction conditions, such as temperature, concentration, pressure, light vs. dark reactions, pH, physical conditions such as stirring, ultrasound treatment, shaking etc. The presence of other gas storage material can help to improve the selectivity and speed of the absorption/desorption of hydrogen and/or oxygen on and/or in the suicides and silicide-like compositions and/or oxides thereof. Absorption and/or adsorption (storage) of oxygen is found in most cases to be very efficient and even more efficient than of hydrogen. The processes stated above leading to the release/desorption of hydrogen are concomitant with the release/desorption of oxygen but are found to be predominant dependent on the reaction conditions applied (such as nature of the silicide or silicide-like composition and/or oxides thereof used, temperature and pressure): E.g. when processing with titanium silicide at ambient temperature and pressure. At higher temperatures and in light the release/desorption of oxygen can be forced.

Furthermore, it was found that the suicides and silicide-like compositions and/or oxides thereof can be employed for the title applications individually or in combinations of two or more suicides or silicide-like compositions and/or oxides thereof. It is also possible to conduct the title processes with one or more of the suicides or silicide-like compositions together with additional semiconductor materials of non-silicide structures such as ruthenium dioxide ($RuO_2$), manganese dioxide ($MnO_2$), tungsten trioxide ($WO_3$) and other semiconducting materials in order to enforce the title processes. The ratio of hydrogen-to-oxygen evolution and storage thereof varies with the semiconductor mixtures, temperature and pressure employed. The same is true for silicides or silicide-like compositions and/or oxides thereof which are doped (see below).

It was also found that storage/release and/or absorption/desorption of hydrogen and/or oxygen using suicides and silicide-like compositions is active when the contact of the silicides and silicide-like compositions and/or oxides thereof to water is disrupted or cancelled, i.e. when the storage device was attached to the reaction vessel externally via a pipe.

Further, it was found that the title processes can be forced by doping/mixing/alloying the silicides and silicide-like semiconductors and/or oxides thereof with any of the previously mentioned elements/residues for the choice of R and/or oxides thereof as well as mixtures thereof in the third paragraph of this chapter.

The suicides and silicide-like compositions and/or oxides thereof can be prepared by bringing into contact the individual elements and/or the oxides thereof as well as other derivatives thereof, all in various ratios in fully or partially oxidized form or in non-oxidized form, this in solution, suspension as well as in solid, e.g. by milling or by alloying/melting, or in liquid or any other chemical and/or physical form.

Polyoxygen of the formula $O_n$ (n>3) and/or hydogenpolyperoxides of the formula $H_2O_n$ (n>2) are formed in the above described reactions from oxygen and preferentially under light and in connection with the above described catalysts reversibly. These methods can also include biochemical transformations such as the application of a peroxidase. Examples of polyoxygen and hydrogenpolyperoxides, i.e. a selection of ring size and chain lengths, show UV-absorptions with maxima in the region of 221 ($O_{16}$), and 202 nm ($HO_8$) (both species with tailing up to 350-400 nm), respectively, and mass peaks/fragmentation peaks in mass spectroscopy at m/z 256 ($O_{16}$), 129 ($HO_8$), 97 ($HO_6$), 81 ($HO_5$) and 32 ($O_2$) in water.

The novel technology based on the use of silicides and silicide-like compositions and/or oxides thereof as stated above can find applications e.g. for the purpose of novel heating systems, in fuel cell technology which will be ultimately applied for and in terrestrial and non-terrestrial traffic and static constructions and devices replacing or supporting or supplementing such constructions and devices driven so far by devices based on the use of conventional fossil energy.

EXAMPLES

Note, in all examples the suicides and silicide-like compositions are oxidized by water and/or oxygen to various degrees (0-100%) dependent on the reaction conditions. But in most cases oxidation stops at a layer size of 1-5 nm depth which protects the catalyst from further (rapid) oxidation. Such effects can be controlled for example by temperature and pH as well as by other physical and chemical conditions. The same or similar effects can be achieved by bringing into contact individually oxidized (0-100%) elements and components of the catalyst's compositions prior to reaction. Analyses of the state of oxidation of the catalysts and the respective components have been performed by XRD and XPS spectroscopy.

Example 1

3-5 g of a titanium silicide ($TiSi_2$ or $Ti_5Si_3$) are stirred in 200-400 mL of water (filtered over ion exchange resin, a slightly lower gas yield was determined when using plain water without purification) in a vessel which is transparent for solar radiation or radiation of an artificial light source. As light source served a Heidelberg irradiation system with lamps having emission maxima at 415, 525, or 660 nm and emission ranges from 300-550, 490-600 or 610-700 nm, respectively, or halogen lamps with emissions in the range of 350-800 nm. This reaction set-ups yield 25 mL and more of hydrogen and oxygen per day at room temperature (gas evolution and ratios depend on the nature of the catalyst used, temperature and pressure). Most of the oxygen is in such reactions absorbed by the catalysts to give hydrogen/oxygen molar ratios of 2/1 up to 20/1. The oxygen and hydrogen evolution is measured volumetrically in conjunction with gas chromatography and mass spectrometry. The experiment can be continued up to at least 3 months if the gas volume of the reaction vessel is emptied and flushed with air after periods of 2-3 days. Alternatively, a solar flatbed reactor made of macrolon or plexiglass and sunlight irradiation can be employed.

Example 2

Instead of the silicides mentioned in example 1, also nickel silicide ($Ni_2Si$), iron silicides ($FeSi_2$, FeSi), thallium silicide ($ThSi_2$), boron silicide ($B_4Si$), cobalt silicide ($CoSi_2$), platinum silicide (PtSi, Pt$_2$Si), manganese silicide (MnSi$_2$), titanium carbosilicide (Ti$_3$C$_2$Si), carbosilicide/poly-carbosilicide (also named silicon carbide/poly-silicon carbide (CSi/poly-CSi or SiC/poly-SiC), iridium silicide (IrSi$_2$), nitrosilicide or also named silicon nitride (N$_4$Si$_3$), zirconium silicide (ZrSi$_2$), tantalum silicide (TaSi$_2$), vanadium silicide (V$_2$Si) or chromium silicide (CrSi$_2$) can be employed. The reactions are carried out as described in example 1.

Example 3

Same experimental set-up as in example 1, but using nickel silicide (Ni$_2$Si). A hydrogen/oxygen molar ratio of approx. 20/1 was measured.

Example 4

If in reactions given in examples 1 and 2, higher temperatures (30-45 degrees Celsius) were applied, more vigorous gas evolution was observed. Conveniently this temperature can be reached by using solar flatbed reactors and sunlight.

Example 5

The same conditions as in examples 1 and 2, but without the application of light gave at higher reaction temperatures (30-40 degrees Celsius) more vigorous gas evolution.

Example 6

A chloroform soluble perylene (but not soluble in water), such as N,N'-bis-phenyl ethyl perylene-3,4,9,10-tetracarboxylic diimide (2 g), was dissolved (in 5 mL of chloroform) and stirred with a titanium silicide (3 g, TiSi$_2$ or Ti$_5$Si$_3$) during 2 hours at room temperature. The solvent was then removed in vacuo and the residue subjected to the conditions stated in example 1. An increase of hydrogen and oxygen evolution (>30 mL per day) was observed.

Example 7

Alternatively to the reaction conditions stated in example 1, a flatbed reactor made of macrolon or plexiglass can be employed wherein the reactor material macrolon or plexiglass was heated (50-100 degrees Celsius) prior to the reaction and in the presence of the semiconductor material (Ni$_2$Si) to achieve immobilization of the catalyst on the polymer surface of the reactor. Otherwise the experiments were conducted as in 1.

Example 8

If for reactions such as stated in example 1, a closed reaction vessel was employed, storage of hydrogen and oxygen is exercised when opening the vessel after two weeks. Vigorous release of hydrogen and oxygen (20/1) at room temperature is observed and the amount of gas collected and measured corresponded to a continuous experimental set-up which includes the collection of the gases repeatedly after 2-3 days. The reason for a lack of oxygen in these reactions has been identified. Oxygen is continuously consumed under the given reaction conditions to form polyoxygen and hydrogenpolyperoxides of the formula O$_n$ (n>3) and H$_2$O$_n$ (n>2), respectively. Polyoxygen and hydrogenpolyperoxides can be converted back to oxygen by treatment with metal oxides (such as with mixtures of MnO$_2$, CuO and silicide oxides) and light or thermal activation.

Example 9

The same reaction set-up as in example 1 was employed here, but 1 g of WO$_3$ was added to the reaction slurry. A more vigorous gas evolution than in example 1 resulted (>30 mL per day).

Example 10

3 g of TiSi$_2$ were doped with Pt using standard techniques. A reaction run according to example 1 gave a higher yield of gases than in the latter example (>25 mL per day).

What is claimed is:

1. A process comprising the step of:
generating hydrogen and oxygen photochemically or thermochemically from water by contacting water with at least one catalytically acting Si-containing compound selected from the group consisting of metallosilicides and non-metallic silicides of the formula RSi$_x$O$_y$, wherein R represents an organic, metallic, organometallic, biochemically derived or inorganic residue, and Si being silicon with X>zero and O is oxygen with Y≧zero, wherein R is lithium, beryllium, sodium, potassium, calcium, copper, zinc, rhodium, scandium, rubidium, gallium, selenium, rhodium, palladium, cadmium, lead, osmium, antimony, iridium, tungsten, tin, strontium, barium, titanium, nickel, iron, thallium, boron, cobalt, platinum, manganese, titanium, iridium, molybdenum, nitrogen, zirconium, tantalum, vanadium, chromium, silver, gold, lanthanides, actinides, organic residues or biochemically derived residues or mixtures of said residues R and wherein said residue is partially oxidized or fully oxidized or not oxidized.

2. The process according to claim 1, wherein said at least one Si-containing compound contains at least one silicon atom with enhanced electron density as compared to an elemental silicon atom.

3. The process according to claim 1, carried out in the presence of light.

4. The process according to claim 1, carried out in the absence of light.

5. The process according to claim 1, wherein the photochemical generation is driven by at least one member selected from the group consisting of artificial light, sunlight in concentrated form, sunlight in diffuse form, and sunlight in concentrated and diffuse form.

6. The process according to claim 1, comprising the step of employing an energy source that emits energy in a range of 200 nm to 20,000 nm.

7. The process according to claim 1, wherein a light absorption of said at least one Si-containing compound is improved by a dye or an agglomeration of dyes.

8. The process according to claim 7, wherein the dye is a perylene or a perylene analogue.

9. The process according to claim 1, carried out at elevated temperature.

10. The process according to claim 1, wherein the thermochemical generation of hydrogen and oxygen is driven by thermal energy generated by at least one device generating thermal energy which device is selected from the group consisting of a photochemical light source, an artificial light source, a solar light source, an electrical furnace, a microwave system, and a geothermal device.

11. The process according to claim 1, wherein storage/release or absorption/desorption of hydrogen or oxygen takes place at or in said at least one Si-containing compound.

12. The process according to claim 11, wherein the storage/absorption of oxygen is concomitant with storage/absorption of hydrogen but at variable ratio.

13. The process according to claim 11, wherein the release/desorption of hydrogen is concomitant with release/desorption of oxygen but at variable ratio.

14. The process according to claim 1, further comprising the step of activating storage/release or absorption/desorption of hydrogen or oxygen by utilizing said at least one Si-containing compound by disrupting contact of said at least one Si-containing compound with water.

15. The process according to claim 1, comprising the step of adding at least one non-silicide semiconductor material or other semiconducting material for enhancing reactivity of said at least one Si-containing compound.

16. The process according to claim 15, wherein the non-silicide semiconductor material is selected from the group consisting of ruthenium dioxide ($RuO_2$), manganese dioxide ($MnO_2$), and tungsten trioxide ($WO_3$).

17. The process according to claim 1, wherein said at least one Si-containing compound is immobilized by being embedded in or attached to or surface-coated on a polymeric material or glass or glass-like material.

18. The process according to claim 17, wherein the polymeric material and the glass-type material are electrically or electronically conducting.

19. The process according to claim 17, wherein the polymeric material is polyamide, makrolon or plexiglass.

20. The process according to claim 1, wherein said at least one Si-containing compound is contacted or doped or mixed with metals or non-metallic compositions.

21. The process according to claim 1, wherein said at least one Si-containing compound is oxidized to form the oxides with various degrees of oxidation (0-100%) in water or water-containing or oxygen-containing media or in the presence of other oxidants, wherein the speed of oxide formation is controlled by adjusting the reaction conditions, wherein the reaction conditions are selected from the group consisting of temperature, the presence of air or other gases, pH of the reaction media, stirring, shaking, pumping, moving the reaction media, and allowing the reaction media to rest.

22. The process according to claim 1, wherein said at least one Si-containing compound is prepared by contacting the individual elements or oxides thereof or other derivatives thereof in various ratios in fully or partially oxidized form or in non-oxidized form in solution, suspension, or in solid form or liquid form or any other aggregation state.

23. The process according to claim 1 wherein oxygen is transformed to polyoxygen of the formula $O_n$ (n>3) or hydrogenpolyperoxides of the formula $H_2O_n$ (n>2) and wherein the polyoxygen or the hydrogenpolyperoxides are stabilized by at least one member selected from the group consisting of a solvent, a metal, and a metal oxide.

24. The process according to claim 23, wherein polyoxygen of the formula $O_n$ (n>3) or hydrogenpolyperoxides of the formula $H_2O_n$ (n>2) is transformed to oxygen by releasing energy.

25. The process according to claim 1, wherein said at least one Si-containing compound is used as part of a common process unifying the generation/production of hydrogen and oxygen from water and storage/release and/or absorption/desorption of hydrogen and oxygen.

26. The process according to claim 20, wherein the metals are selected from the group consisting of lithium, beryllium, sodium, potassium, calcium, copper, zinc, rhodium, scandium, rubidium, gallium, selenium, rhodium, palladium, cadmium, lead, osmium, antimony, iridium, tungsten, tin, strontium, barium, titanium, nickel, iron, thallium, cobalt, platinum, manganese, titanium, silicon, iridium, molybdenum, zirconium, tantalum, vanadium, chromium, silver, gold, lanthanides, and actinides.

27. The process according to claim 20, wherein the non-metallic compositions contain or are nitrogen, boron, silicon, organic residues, or biochemically derived residues or mixtures thereof which can also exist as charged species or radical, wherein the non-metallic compositions optionally contain metals selected from the group consisting of lithium, beryllium, sodium, potassium, calcium, copper, zinc, rhodium, scandium, rubidium, gallium, selenium, rhodium, palladium, cadmium, lead, osmium, antimony, iridium, tungsten, tin, strontium, barium, titanium, nickel, iron, thallium, cobalt, platinum, manganese, titanium, silicon, iridium, molybdenum, zirconium, tantalum, vanadium, chromium, silver, gold, lanthanides, and actinides.

* * * * *